Figure 1:
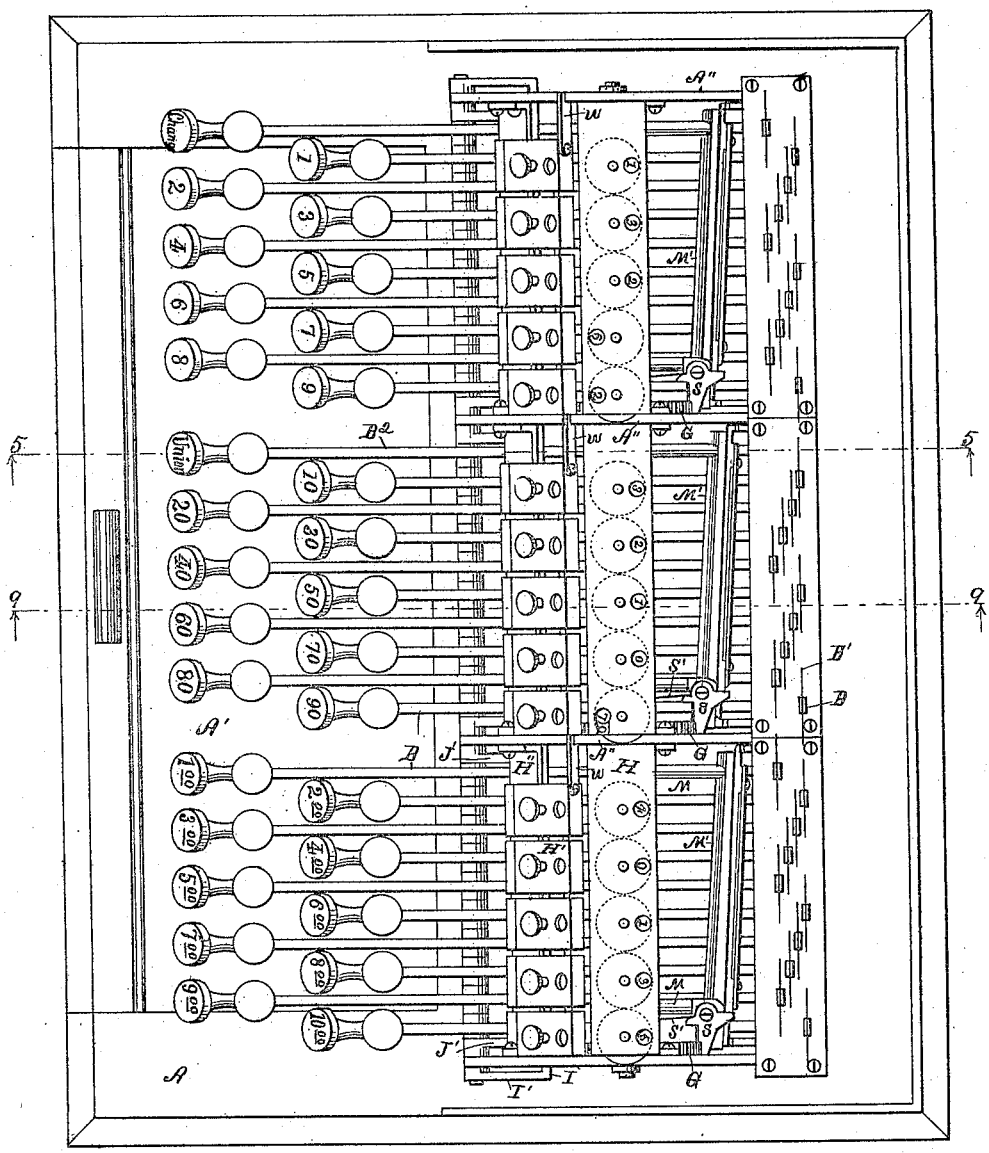

(No Model.)

8 Sheets—Sheet 1.

L. COONEY, Jr.
CASH REGISTER.

No. 575,331.

Patented Jan. 19, 1897.

Witnesses:
W. S. Wood
V. E. Chappell

Inventor,
Luke Cooney Jr.
By Fred L. Chappell
Att'y (No Model.) 8 Sheets—Sheet 2.
L. COONEY, Jr
CASH REGISTER.
No. 575,331. Patented Jan. 19, 1897.
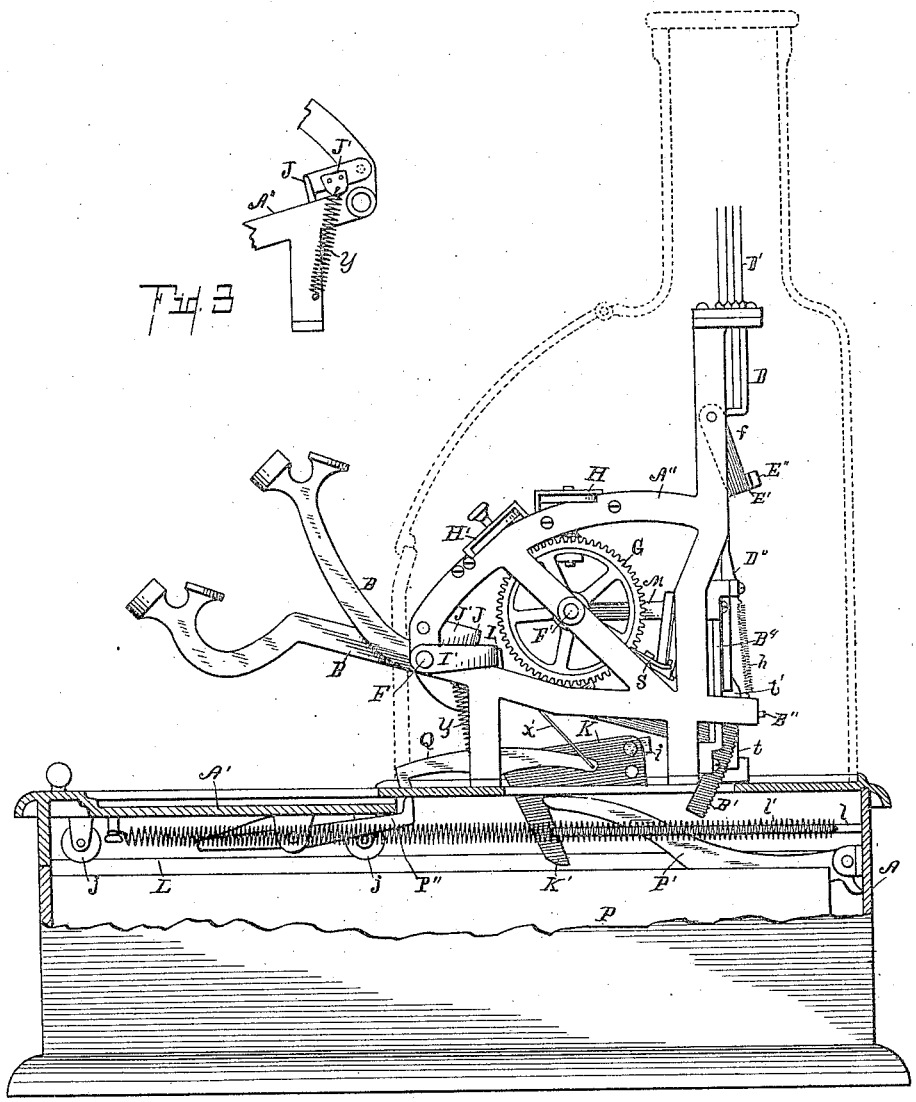
Witnesses:
W. S. Wood
V. E. Chappell
Inventor,
Luke Cooney Jr
By Fred L. Chappell
Att'y.

(No Model.) 8 Sheets—Sheet 3.
L. COONEY, Jr.
CASH REGISTER.
No. 575,331. Patented Jan. 19, 1897.
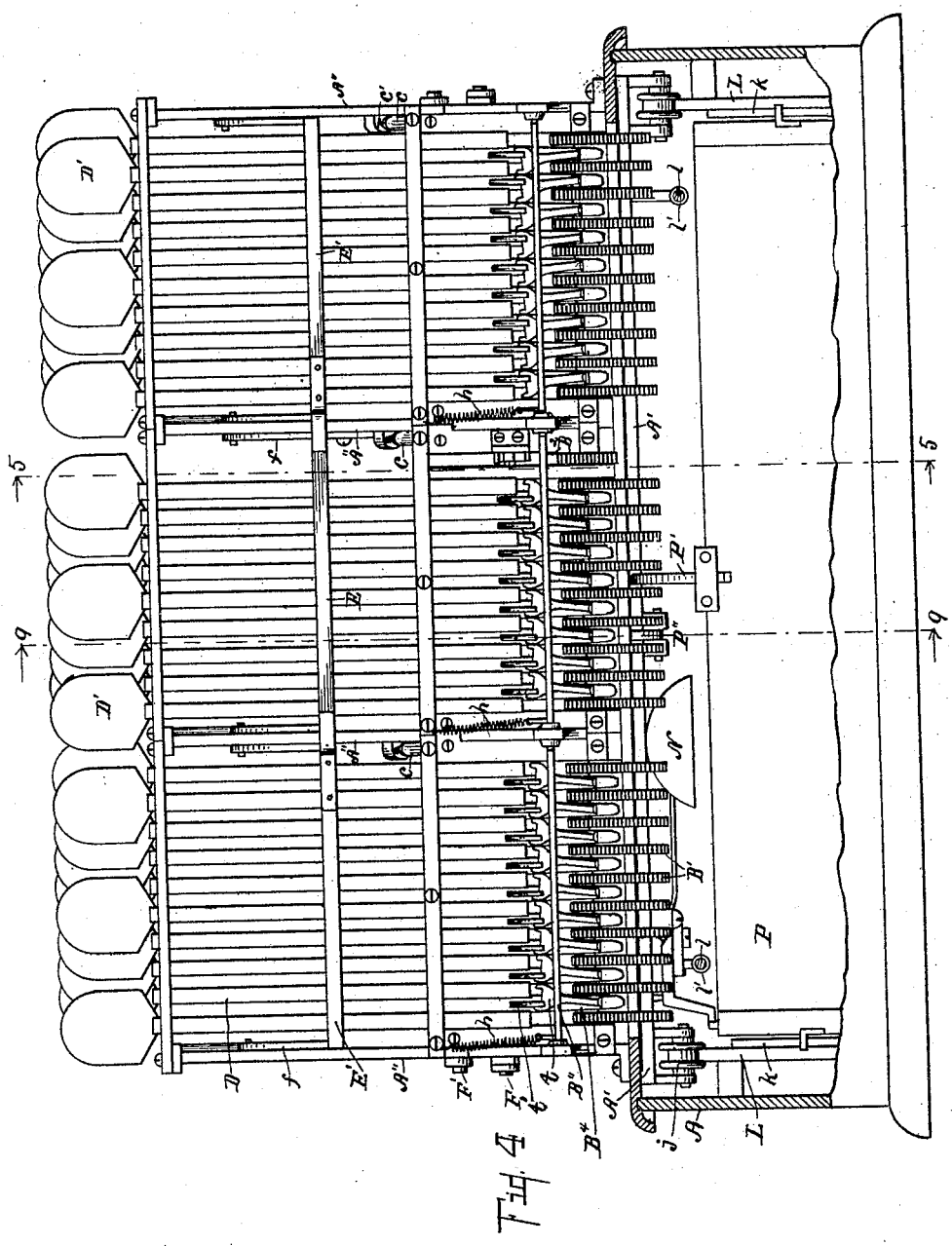
Witnesses:
W. S. Wood
V. E. Chappell
Inventor,
Luke Cooney Jr
By Fred L. Chappell
Att'y.

(No Model.)
8 Sheets—Sheet 4.
L. COONEY, Jr.
CASH REGISTER.
No. 575,331.
Patented Jan. 19, 1897.
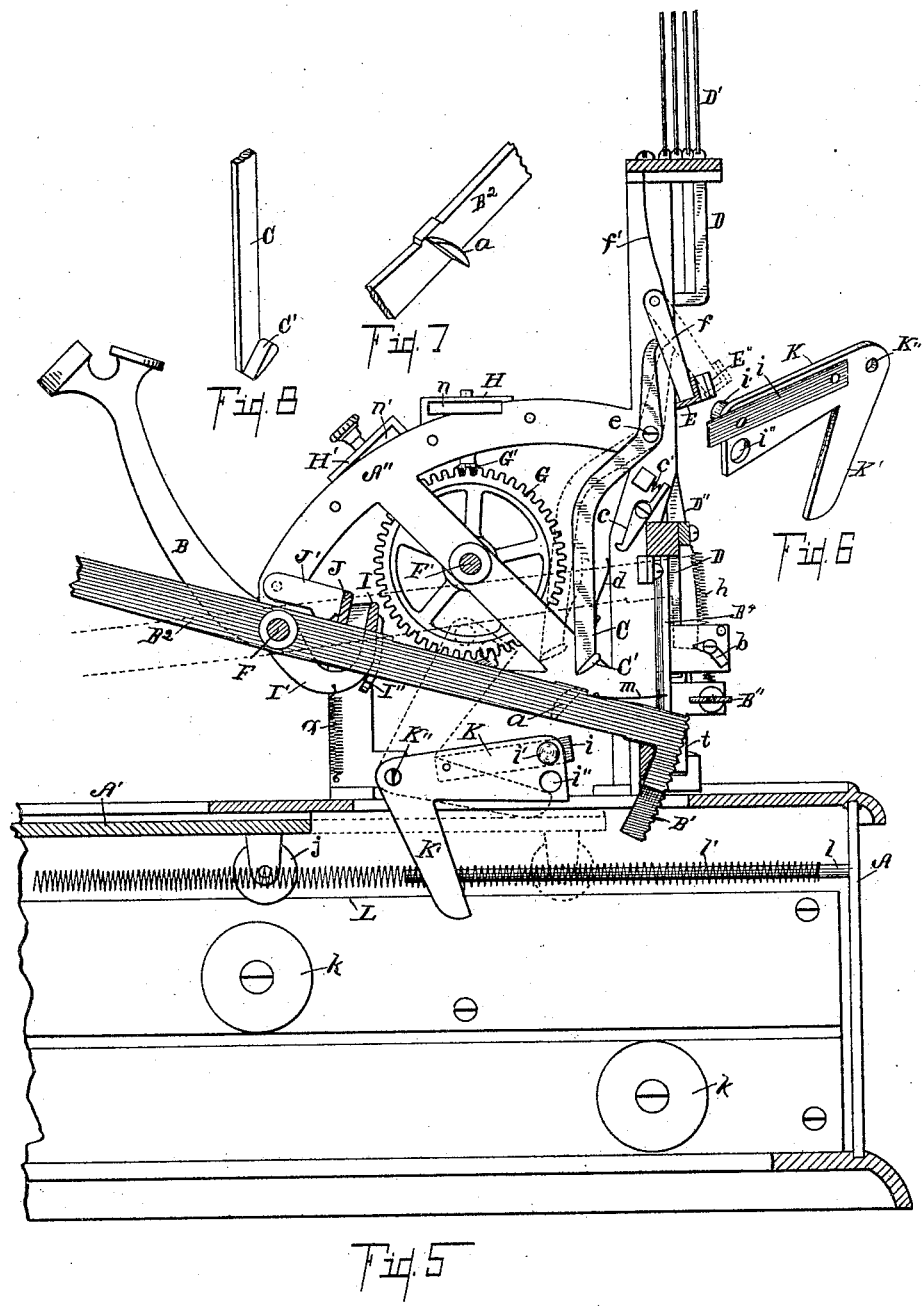
Witnesses:
W. S. Hood
V. E. Chappell
Inventor,
Luke Cooney Jr
By Fred L. Chappell
Att'y.

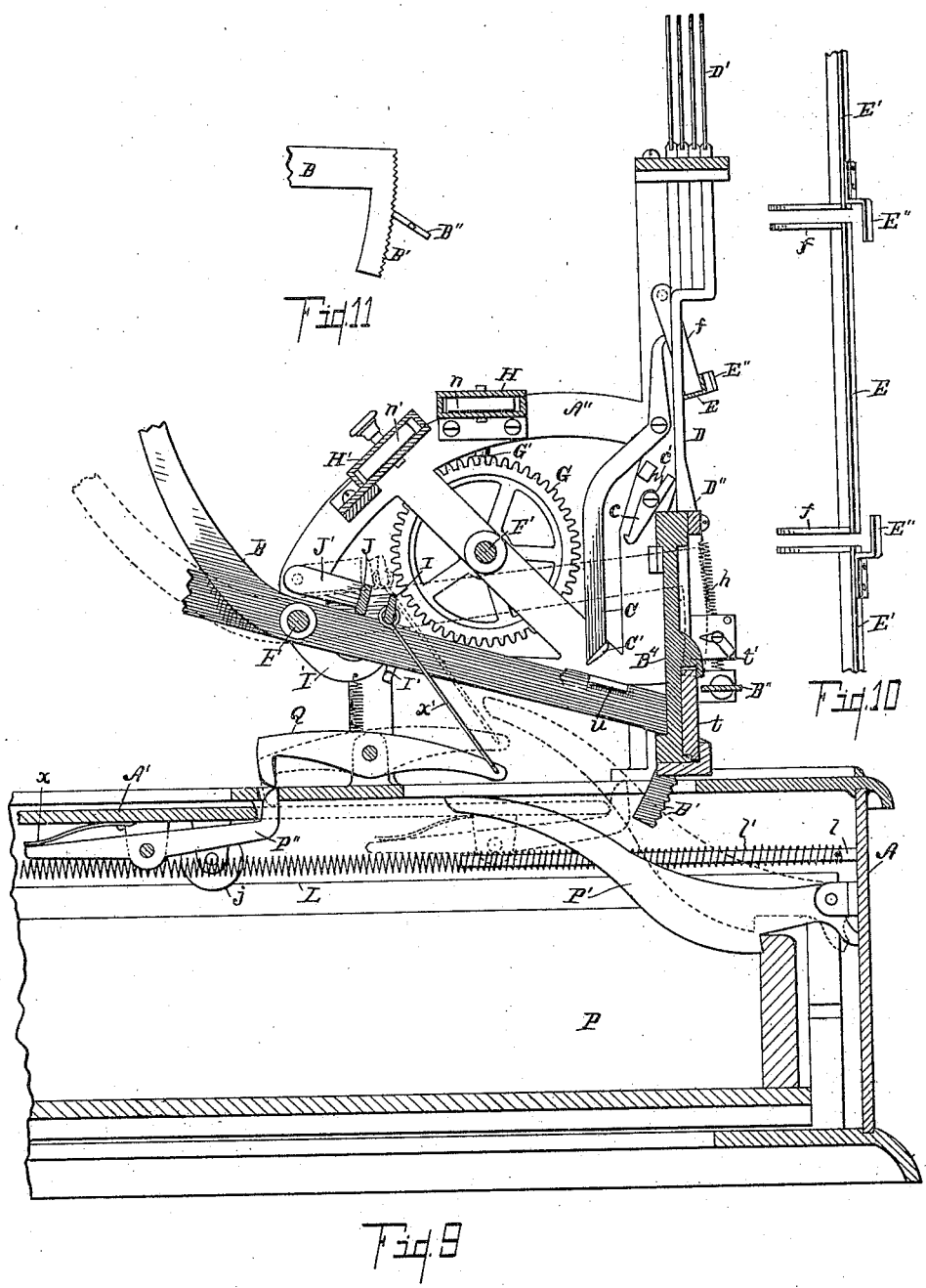

(No Model.) 8 Sheets—Sheet 6.
L. COONEY, Jr.
CASH REGISTER.
No. 575,331. Patented Jan. 19, 1897.
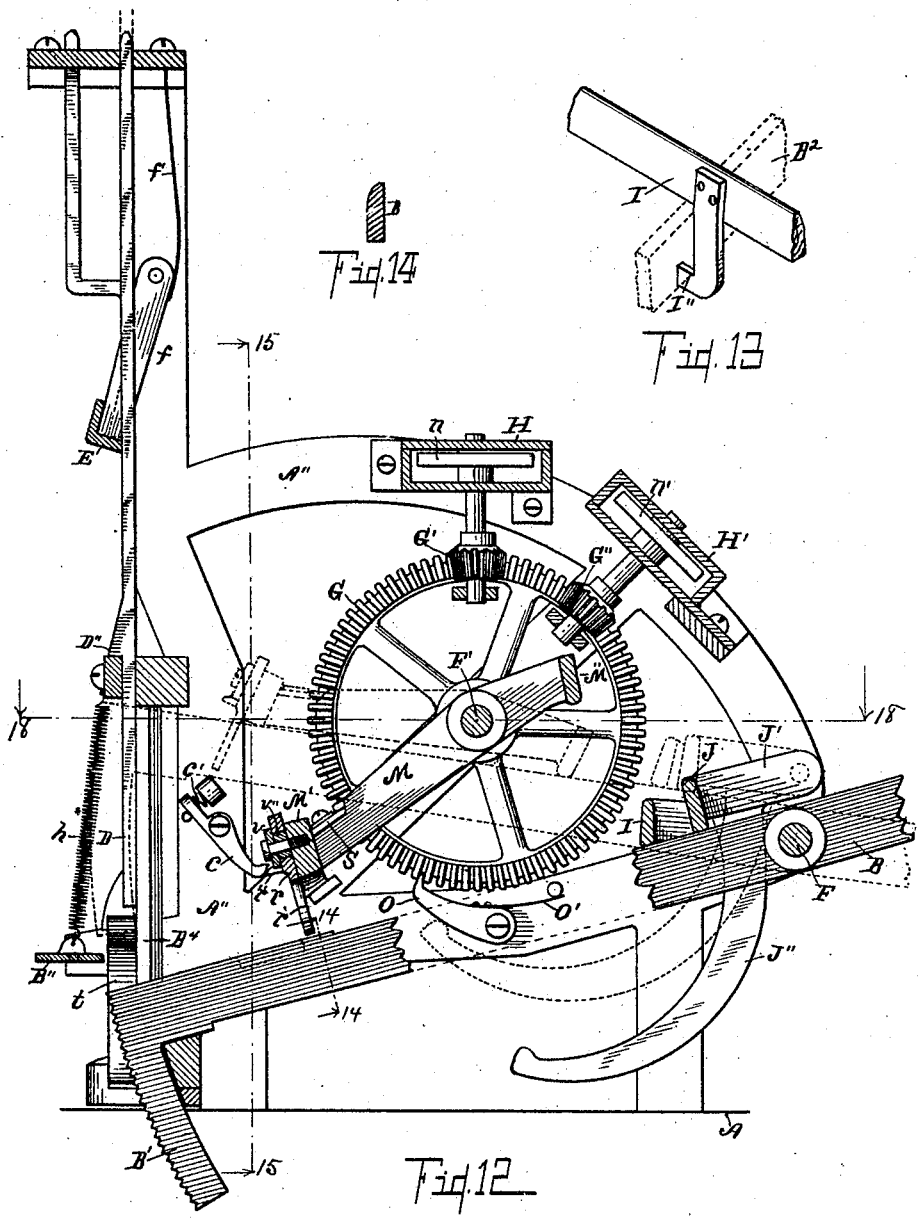
Witnesses:
W. S. Wood
V. E. Chappell
Inventor,
Luke Cooney Jr.
By Fred L. Chappell
Att'y.

(No Model.) 8 Sheets—Sheet 7.
L. COONEY, Jr.
CASH REGISTER.

No. 575,331. Patented Jan. 19, 1897.

Witnesses:

Inventor,
Luke Cooney Jr.
By Fred L. Chappell
Atty.

UNITED STATES PATENT OFFICE.

LUKE COONEY, JR., OF KALAMAZOO, MICHIGAN, ASSIGNOR, BY MESNE ASSIGNMENTS, TO VERNON T. BARKER, TRUSTEE, OF SAME PLACE.

CASH-REGISTER.

SPECIFICATION forming part of Letters Patent No. 575,331, dated January 19, 1897.

Application filed October 23, 1895. Serial No. 566,668. (No model.)

*To all whom it may concern:*

Be it known that I, LUKE COONEY, Jr., a citizen of the United States, residing at the city of Kalamazoo, in the county of Kalamazoo and State of Michigan, have invented a certain new and useful Cash-Register, of which the following is a specification.

My invention relates to a new and improved cash-register.

The objects of my invention are, first, to construct a cash-register which is absolutely perfect in registration; second, to simplify the mechanism and working parts of the cash-register; third, to make a cash-register which shall contain few parts and admit of perfect construction for perfect work at a greatly-reduced cost of manufacture; fourth, to construct a register which will not require close fitting of parts to secure accuracy; fifth, to provide a cash-register in which it is impossible to overregister or vary the registration by any manipulation of the keys; sixth, to provide in a cash-register means whereby, after a key completes its stroke, it is entirely disengaged from the register mechanism; seventh, to provide improved means of securing complete and accurate registration of a number of indicator-tablets struck up at the same time; eighth, to provide an improved money-drawer mechanism for cash-registers; ninth, to provide new and improved means of locking the registering mechanism at the end of a stroke of a key; tenth, to provide new and improved means of compelling the complete operation of the key after it is started; eleventh, to provide improved means of returning the keys promptly to their initial position after their stroke is completed, other and further objects appearing definitely in the detailed description. I accomplish these objects of my invention by the devices and mechanism described in the following specification and shown in the accompanying drawings, in which—

Figure 15:
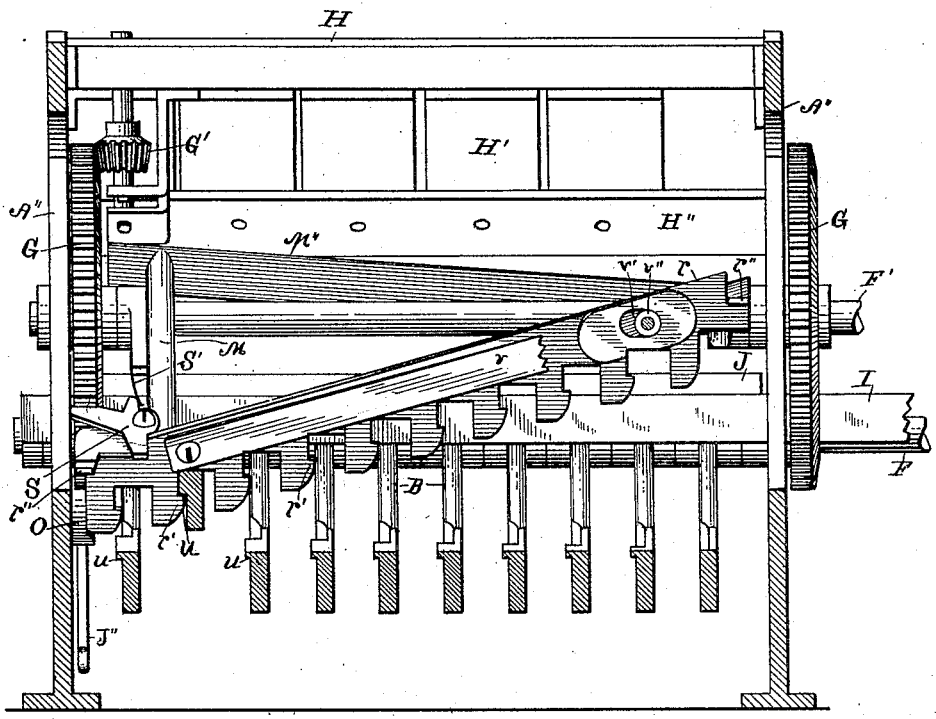
Figure 16:
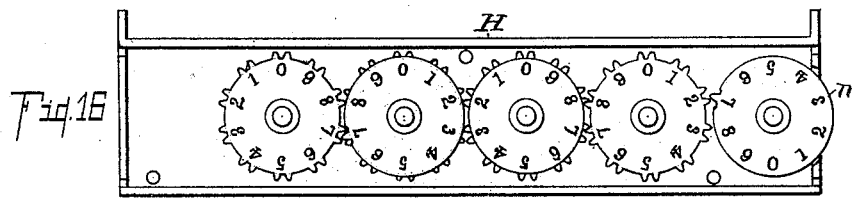
Figure 17:
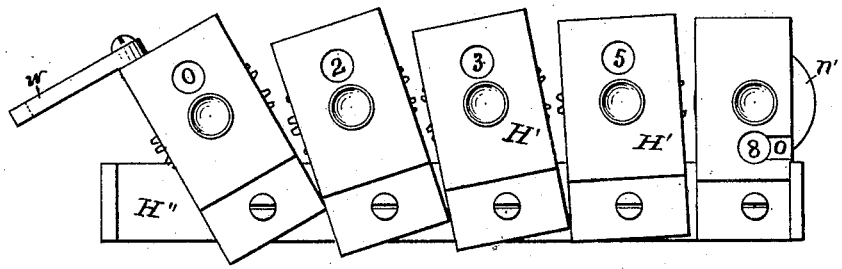
Figure 18:
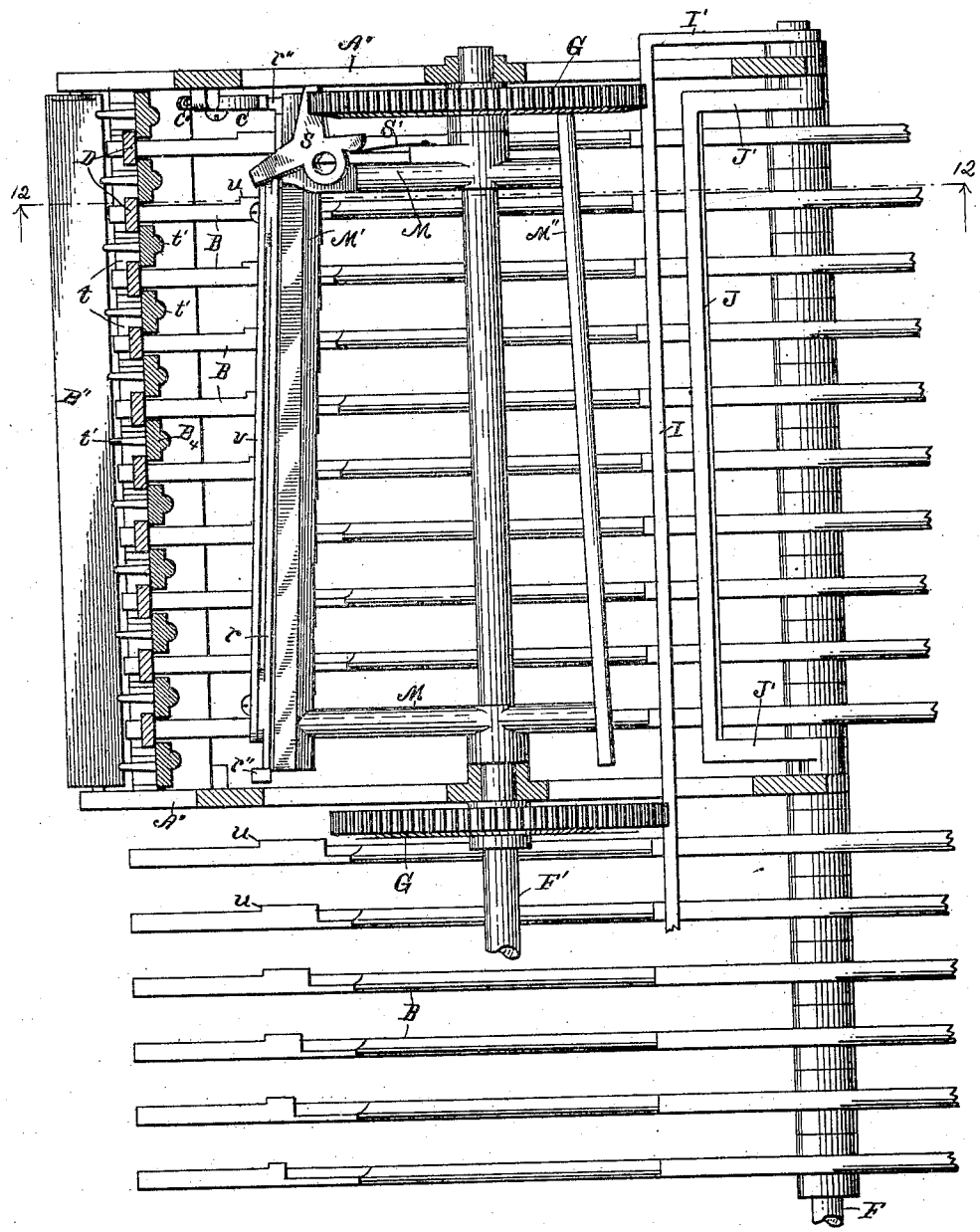

Figure 1 is a plan view of a cash-register embodying all of the features of my invention with the upper casing removed. Fig. 2 is a side elevation of the machine from the right-hand side of the machine, the top casing being shown in dotted lines and the lower casing or base being broken away to show details. Fig. 3 is a reverse detail view of the end connection of transverse bar J and spring $y$ and its connection appearing in Fig. 2. Fig. 4 is a rear elevation of the machine, the upper casing being removed and a portion of the base being broken away to show the details of construction. Fig 5 is an enlarged detail perspective sectional view on line 5 5 of Fig. 4, the front part of the base and keys being broken away. Fig. 6 is a detail perspective view of the lever K K' appearing in Fig. 5. Fig. 7 is an end detail perspective view of the lower end of the lever C, which releases the indicator-slides, showing the cam-lug C''. Fig. 8 is a detail view of the lower end of lever C, showing the cam-lug C'. Fig. 9 is an enlarged detail sectional view on line 9 9 of Fig. 4, the front portion of the base and keys being broken away; showing the drawer actuating and locking mechanism. Fig. 10 is an enlarged detail view of the transverse pivoted bars to the rear of the machine for retaining the indicator-slides in the elevated position. Fig. 11 is a detail view of the end of one of the keys with the reversible detaining-dog in position. Fig. 12 is an enlarged detail sectional view on line 12 12 of Fig. 18, showing the register mechanism, means of locking the same, and adjacent parts. Fig. 13 is an enlarged detail perspective view of a portion of the common bar I, called the "union-bar," and the hook by which it engages the union-key. Fig. 14 is a sectional view on line 14 14 of Fig. 12, showing a cross-section of one of the keys at the vicinity of contact with the register mechanism. Fig. 15 is an enlarged detail sectional view on line 15 15 of Fig. 12, showing parts of the register mechanism. Fig. 16 is a detail view of the permanent adder with the top casing removed. Fig. 17 is an enlarged detail view of the daily adder. Fig. 18 is an enlarged detail sectional view on line 18 18 of Fig. 12.

In the drawings all of the sectional views are taken looking in the direction of the little arrows at the end of the sectional lines, and similar letters of reference refer to similar parts throughout the several views.

Referring to the lettered parts of the drawings, A represents the base which carries the drawer and to which the locking and actuating mechanism is attached.

A'' represents the general framework of the machine above, which is supported on the top of the base A. On a shaft F, passing through the front of the frame A″, are pivoted the keys B B, which are in three groups and two banks. On the outer end of the keys are suitable marked disks, with horizontal disks above for the application of pressure for actuating the same. Across each section of the keys in front of the rod or shaft F is a bar J, which is pivoted on suitable arms on pivots just above the rod F. The spring $y$ is attached to a suitable ear J′ on the same and extending downwardly, and is attached at its lower end to the frame A″. This returns the keys promptly to the initial position after any one of them has been operated.

The keys project rearwardly back through the frame A″, and on the rear end of each key is a downwardly-depending trailer portion B′, and on the back of which is a suitable rack, which is formed on the arc of a circle having for its center the center of the rod F.

Extending transversely across each section of the machine and to the rear of the frame is a bar B″, pivoted at each end, so that it will rock back and forth. To an upwardly-projecting ear thereon there is attached a coiled spring $h$, which extends upwardly and and is attached to the frame A″. This holds the bar in substantially the horizontal position, and it acts as a pawl on the trailers B′ and will act as a detent for any key when passing in either direction until it reaches the end of its stroke, when the trailer passes the bar and allows it to reverse. This has the effect of compelling the complete operation of any key in either direction until it has completed its stroke, and is a very simple and effective means to that end. The bar B″ is a common pawl to all of the keys of a group.

The rear ends of the keys B are guided between suitable upright bars B⁴ to the rear of the casing A″. Supported on each of these bars is a wedge-shaped piece $t$, which is pivoted at its lower end in the bar and retained at its upper broad end by an outwardly-projecting hook-shaped lug $t'$ in a little fork formed at the end which limits their motion. The amount of motion of each one of the wedge portions $t$ is limited to the thickness of one of the keys. When any one of the keys is struck up, it crowds the adjacent wedges $t$ to each side in passing, and by so doing moves the other wedges $t$ to each side and prevents their being returned until the key has completed its stroke and returned to the normal position. The key being between the wedges prevents any other key from being actuated, because it cannot move the wedges to one side to allow it to pass, the movement of the wedges being limited by the lugs $t'$ at the top. Each set of keys is provided with an independent set of these wedge-like body parts $t$, called "key-arresters," for arresting the motion of more than one key at a time.

Above each key B are suitable indicator-slides D, which are adapted to move up and down in suitable guideways. At the top of the slides D are supported indicator-tablets D′. Below and to the rear of each indicator-slide is a catch D″, facing downward. These indicator-slides are adapted to be raised by the keys, and there are suitable means of retaining them in the elevated position which will be hereinafter described, along with the means of releasing the same.

This machine is made up of three sections or divisions, the first registering from one cent to nine cents at a stroke, the second group indicating and registering the units of the next higher scale, that is, from ten cents to ninety cents, and the third group registering dollars, from one dollar to ten dollars.

A bar E′ extends across the back of the indicator-slides of each outside group or division of the machine. A bar E extends across the backs of the indicator-slides of the central division. These bars are held in place by suitable upwardly-projecting arms $f$, which are pivoted to the frame A″ above. A spring $f'$ actuates each bar so that each swings positively against the backs of each group of indicator-slides. Projecting inwardly from each bar E′ and adapted to lap over the bar E are projecting ears or arms E″, which will be struck by the central bar when it is pushed back and swing back the outside bars E′ as well. These bars engage under the catches D″ of the indicator-slides and hold them in the elevated position.

Across all three of the groups of keys extends a common bar I, which is pivoted on the ends by suitable arms I′ on the rod F. The actuation of any key of any group operates the bar I. The bar is promptly returned to the initial position by springs $g$, after the union-key has been released, secured to the under side of the same. To one side of the central section or division is a key B², which I call the "union-key." This key is connected by a hook, as I″, or other suitable means to the union-bar I, above referred to, and the union-key is consequently actuated, when any key of the entire machine is actuated, for a complete new operation. There is a downwardly-extending trailer at the rear end of the union-key, the same as on the other keys of the machine, only somewhat shorter, on which is formed a suitable rack. An independent reversible pawl $b$ is supported on a projection to the rear and above the common pawl B″, which acts only on the union-key. On one side of the union-key B² is a cam-lug $a$. (Clearly shown in Fig. 7.) Pivoted to the frame A″ of the machine at $e$ is a lever C, on the lower end of which is a cam-lug C′. A small spring $d$, resting against a part of the frame, supports this lever in its proper position. The upper end of this lever is adapted to engage one of the upwardly-projecting arms $f$ from the bar E, and is adapted to act upon the same and throw the detaining-bars E E′ E′ outwardly to permit the indicator-slides to drop. This lever C is actuated when the union-key B² is actuated by the cam-lug $a$ on the key striking the cam-lug C' on the lower end of the lever C.

It will thus be seen that when the union-key is in the normal position the actuation of any key will operate the union-key and by so doing actuate the lever C, which will throw out the detaining-bars E E'' E' and cause all indicator-slides to drop. The pressure being continued the cam portions pass each other, the lever C drops away from the arm $f$, the detaining-bars E E' E'' will return to their normal position and engage the slide struck up, no matter what the slide may be. The striking up of any key does not carry the union-key to its highest position. Until the union-key reaches its highest position it will be detained by the reversible pawl $b$, so that when a key of each division is operated the union-key still remains in the elevated position and is lowered by merely touching it, which carries it upward the remainder of its stroke, when the pawl $b$ reverses and allows it to drop, when it is ready for another evolution of the machine. A spring $m$ on the upper side of the union-key prevents a quick stroke throwing it too far. Under ordinary circumstances I actuate the union-key by this operation of the drawer-cover or the cover mechanism, as will hereinafter appear.

The money-drawer P of my improved cash-register is supported and slides into the base of the machine. To the center of each side of the drawer is a suitable guide, which slides in a suitable horizontal grooved bearing toward each side of the base in the vertical pieces L. Suitable rollers are on the pieces L above and below the guide-pieces. There is a cover A' to the front portion of the drawer, which is carried on rollers $j\ j$, which ride on the upper edges of the pieces L, which form a track for the same. Projecting forwardly from the rear of the base are rods $l$, which support coiled springs $l'$, which are attached to downwardly-projecting knobs or pins on the drawer-cover A'. On the under side of the cover A' is a catch-lever P'', which is rounded on its front side and adapted to engage in a hole in the top of the base. A spring $x$ on the outer end of said lever to operate. When the drawer-cover A' is drawn forward, the catch P'' engages a hole in the top of the base A. A suitable release mechanism, hereinafter to be described, actuated from the keys above, depresses this catch and allows the cover to open.

To the rear of the base A, pivoted to a suitable lug, is a lever P', having a hook formed on its under side and a stop to hold it in an operative position when the drawer is removed. The under side of this lever curves upwardly and forwardly, crossing the path of the cover A'. When the cover A' is released and flies open, it slides under the lever P' and raises it up, and by so doing unhooks the lever from the drawer, which can then be easily drawn out. This construction of drawer is very advantageous in that the first compartments can be used for coins and the rear compartments for bills. Thus under ordinary circumstances the mere sliding of the cover forward by the operating of the machine opens the drawer all that is required. If it is necessary, the operator can easily open the drawer a little farther and have access to the bill or bank-note department. When the drawer is closed and the cover A' drawn out, all is locked and no one can gain access to the money-drawer without operating the register above. The usual alarm-bell is provided, and is actuated by any suitable projection on the cover when it flies open. The alarm-bell is also actuated by a projection from the drawer when it is pulled open, thus giving a double alarm.

On a lug on the under side of the base A is pivoted a lever Q, with a downwardly-projecting end adapted to strike the upper end of the catch-lever P''. The rearward end of this lever is connected by a link $x'$ to the common or union bar I. As the bar I is actuated the first key in a new operation is operated. It will raise the rear end of the lever Q, which will depress the forward end, which will depress the catch P'' and release the drawer below.

A bent lever K K' is pivoted beneath the union-key and above the path of the cover A' of the money-drawer at K'', which pivot may be attached to the upper part of the base A or to the frame A'' above. The main portion K of the lever projects rearwardly into the machine. There is a pin $i$ thereon for engaging underneath the union-key to support it in its highest position. The other end K' of the lever projects downwardly and rearwardly across the path of the cover A'. The under end of the portion K' of the lever is rounded, so that the cover will pass readily under it. When the cover is released by the depressing of a key which also actuates the union-key, it slides under the arm K of the lever and raises the portion K' to the position indicated by the dotted lines in Fig. 5. Then the pin $i$ sustains the union-key in the elevated position so long as the drawer is open. When the cover is drawn forward, the lever K K' drops of its own weight and allows the union-key to return to its initial position.

When it is desired not to actuate the union-key from the drawer mechanism, the pin $i$ is lowered into the hole $i''$, which does not raise the rear end of the union-key to its highest position. Consequently the drawer-cover does not actuate it, and it is necessary to touch the union-key in order to complete its stroke and return it to its initial position ready for another evolution.

The registering mechanism is actuated from gear-wheels G on the shaft or rod F', which is located above and to the rear of the shaft F, on which the keys are pivoted. The registering mechanism for each section of the machine is identical, with the exception that units of a different order are registered in each one. The arms M M are supported on suitable hubs, which have their bearing on the shaft or rod F'. These arms M M stand at different angles to the plane of the keys B and at an angle to each other, and carry on their rear ends a bar M' and toward the front of the machine a bar M'', which bars are transverse to the keys B and above the same, so that each key in striking the arm will actuate the same a different amount, varying in proportion to the sum marked upon the front of the key. The bar M'' is located at such a height and position that when the bar M' has reached the height to make a complete registration it strikes the top of the key in a position to the front of the shaft F', and serves as a perfect stop and prevents its being carried too far to register the amount perfectly. To the rear of each bar M' is an additional bar $r$, supported on little rollers $r''$ in longitudinal slots $v'$ therein. A bar $v$ is still back of the bar $r$ in position. On the under side of the bar $r$ are downwardly-projecting cam-shaped hook-catches $r'$, corresponding in number to the registering-keys B of the machine. To the right-hand end of the bar M' is pivoted a dog S, adapted to engage between the cogs of the gear on wheel G. The bar $r$ is adapted to strike against the dog S and force it into engagement with the wheel G. As I said before, there is one of the downward projections $r'$ to correspond with each key of a section. The keys are adapted to strike under the cam portion in their operation and carry the bar $r$ toward the right to force the dog S into engagement with the gear-wheel G. When the key is thrown up against the graduated bar M', the bar slides outwardly over it as it passes up. A projection $u$, shouldered on the under side, is formed on each key and engages the hook-notch of the portion $r'$, which will retain the graduated bar M', so that it cannot be thrown away from the key, which of course effectually prevents any throwing over of the registering mechanism from a quick motion of the key.

Supported on the frame A'', toward each end of the bar M', is a pawl $c$, held to position by spring $c'$. To each end of the bar $r$ are rearwardly-projecting ears or lugs $r''$, which are in position to be engaged by the pawl $c$ and retained there until the bar $r$ is carried to one side by the operation of one of the keys B. This locks the registering mechanism so that it can only be actuated from one of the keys. When the key reaches the upper end of its stroke, the engaging notch of the portion $r'$ slides off the projecting portion $u$, so that when the key drops back the bar $r$ is released and forced back by the spring S' of the dog S to its initial position. When the arm M' drops down, it of course carries the bar $r$ with it. The pawls $c$ are forced back by the lugs or ears $r''$ on the bar $r$, which engage it and prevent its operating in any other way except by the keys, as above described.

A dog O, actuated by a spring O' on the under side of gear-wheel G, retains the same in place and prevents its return. To the transverse bar J or its arm J' is secured a downwardly and forwardly curved arm J'', which when the keys are actuated to the end of their stroke strikes against the dog O and holds the same securely into the gear and prevents any tampering with the registering mechanism when a key is depressed, and also holds the gear-wheel G and assists in preventing its being thrown too far in case the remaining mechanism should for any reason fail. This construction prevents injury to the gear from the stop.

The gear-wheel G is provided with teeth which project outwardly, known as "spur-teeth," and also on the face teeth forming a bevel-gear. A small pinion G' extends down from the case H above and is actuated by the gear G. This pinion actuates the adder contained in the case H, which consists in a train of gear-wheels fast to their axles within the casing H, which contains suitable apertures for exposing the numbers on the face of the wheels close to the periphery. This is the main adder. The adder shown in detail in Fig. 17 is for the central section, and a cipher is placed in front of the right-hand figures and appears there permanently. That figure is lowered to the bottom to indicate that that item is cents, and the remaining figures above and to the left indicate dollars.

In Fig. 17 is illustrated an adder which can be returned to the initial position with facility. The casing is made up of sections H', which each contain their appropriate gear-wheels. These are pivoted a little distance apart to the bar H'' and can be swung down and separated and each section returned to zero by turning the little buttons which appear on the top. The right-hand section is turned so that its beveled pinion G'' will be thrown out of engagement with the gear-wheel G. When all are adjusted at zero, the pivoted sections H' are turned back parallel with each other and secured in position by the button $w$, which is pivoted to the top of the left-hand section H'. Any other adder or register can be operated from gear-wheel G.

Having thus enumerated all of the parts of my invention and their relation to each other, I will now point out in detail a single complete registration upon the machine, assuming that some of the indicator-slides have been struck up by a previous registration. When the front of any key is depressed, it raises up the rear portion of the key, which raises its appropriate indicator-slide. It strikes the union-bar I, which by its connection elevates the union-key B², which causes a cam $a$ thereon to strike the cam C' on the lower end of lever C, which by its connections swings outwardly the central bar E, which strikes against the lugs E" on the detaining-bars E' and carries them all out, releasing every indicator-slide that is up. It will be readily seen that the indicators are released by the union-key B², in connection with the lever C and its mechanism, and not by the indicator which is being raised. The motion continuing the cam $a$ passes the cam C', the lever C drops to its normal position and allows the detaining-bars for the indicator-slides to return. The register-key being further depressed carries its indicator-slide up to the highest position, and it is detained in the elevated position by its detaining-bar at the back. A tablet in each section or division of the machine can be struck up without interfering with the tablets of any other division because the detaining-bars E E' E" operate independently, so that one tablet in each division can be held in view at the same time. When a key of any section is depressed, it also passes up between or to one side of the wedge-like bodies $t$, which swings them over across the paths of the remaining keys, so that only one key of a section can be operated at a time; also, when the key gets up it is detained by the common reversible pawl B" to the rear of its section, thus making it necessary to push the key to the limit of its stroke before the pawl will reverse and allow it to return to the beginning of its stroke before the pawl will reverse to relieve it. When the key is depressed and raises the bar I, it also actuates the connection $x'$, the lever Q, which releases the catch P", and releases the drawer-cover A', which slides or rolls backwardly, uncovering the front of the money-drawer and unlocking the drawer by sliding under the lever P', so that the entire drawer can be drawn out, if necessary. When the cover A' slides back, it strikes lever K K', which elevates the union-key to the limit of its stroke, when it will drop down to the initial position ready for action as soon as the drawer is closed. When the drawer is closed, it permits the union-key to return and the keys assume the initial position, and also when the key is struck up it strikes one of the downwardly-projecting cam-hooks $r'$, carrying the bar $r$ to one side, which actuates the dog S, causing it to engage the gear-wheel G. As the pressure is continued the shouldered projection $u$ on the key engages the square catch on the cam portion $r'$, locking the graduating-bar and key together for the remainder of their stroke, and also locking the dog into the gear-wheel G. Further pressure on the key raises the graduated bar M' to the highest position, when the opposite bar M" strikes the key on the other side of the shaft, forming a perfect stop. This complete movement draws the shouldered projection $u$ out of the catch on the cam-piece $r'$, and will permit the key to drop below the same, when the spring S' throws the dog S out of gear and throws the bar $r$ back to the left and disengages it from the register mechanism, when it will be allowed to follow the key down, if necessary, when the projection $r''$ will pass by the pawl $c$ and the graduating-bar M' will be retained in position for the next registration. It will be seen that the key and graduated bar when locked together can only move up, but when the stroke is completed the key can be moved indefinitely without moving the adder above. When a key is depressed, it also carries up bar I, which is pivoted to the shaft F by suitable arms J'. A spring holds the bar normally against the keys to return them promptly as soon as their stroke is completed. A curved arm J", under and in contact with the pawl O, acts upon the gear G, when the key is near the end of its stroke, and prevents any violent blow on the key throwing the gear forward beyond its actuating-dog, and does this without injury to the gear. The actuation of the wheel G turns the pinions G' and G", and actuates both of the adders above. After the day's business is done the lower or duplicate adder can be unlocked and separated and each indicating-wheel be returned to the zero position, when the machine will be ready for another day's work.

Having described in detail and specifically my entire cash-register, I desire to state that it can be greatly varied in its details without departing from my invention, and this is especially true of my improved drawer and of my improved graduated-bar mechanism and its connected devices, and of the union-key feature, and of the special means of supporting and operating the indicator-tablets and the special locking mechanism for the registering-wheels. It will be readily understood that there is a great variety of catches that can be substituted in the place of catch P" for the drawer-cover. Other means can be easily devised from what I have shown for locking the keys to the graduating-bar. The union-key can be attached to the union-bar by very numerous methods. The tripping mechanism for the indicator-slides can be used in a great variety of detaining devices for that purpose, and there are various other and numerous changes which will readily suggest themselves to those skilled in the art to which my invention pertains.

Having thus described my invention, what I claim as new, and desire to secure by Letters Patent, is—

1. In a cash-register the combination of the base A, carrying the frame A", above; keys B, pivoted on shaft F, toward the front part of said frame A", and having downwardly-projecting trailers B', to the rear guided between suitable upright bars B⁴, and having racks on the said downwardly-projecting trailers; a pivoted bar B", to the rear of each set of said keys acting as a reversible pawl to compel the complete evolution of any key started; wedge-shaped bodies $t$, pivoted on said bars B⁴, and retained by the hook-lugs $t'$, which limits their motion thereof to the width of a single key for arresting all of the remaining keys when any key is struck up; indicator-slides D, corresponding to said keys and above the same bearing indicator-tablets B', at the top and having catches D'', to their back side; detaining-bars E, E', E', for each section of said keys; lugs E'', E'', on the bars E, E', projecting to the rear of the bar E; a transverse union-bar I, pivoted on shaft F, and extending across all of the keys of said machine; a key B², called the "union-key" connected by a suitable hook I'', to the union-bar I, to actuate the union-key whenever any register-key is operated for a new registration; a lever C, pivoted in the central section of the casing A'', with a cam-lug C', below at the lower end thereof; a cam-lug $a$, on the union-key B², for striking said lug C, when the union-key is raised to operate the lever C, to throw out the central detaining-bar E, to release all of the indicator-slides that are up; a rack on a downwardly-depending trailer to the rear of the key B²; an independent reversible pawl $b$, for detaining the said union-key in the elevated position, until it has completed its stroke when it returns to its initial position; a drawer P, in the base A; a hooked lever P', projecting upwardly and forwardly to retain said drawer; a cover A', to said drawer carried on suitable rollers; a catch P'', to said cover A', for engaging a hole in the top of said base A; a lever Q, pivoted above the top of said base in position to strike the detaining-catch of the drawer; a link $x'$, connecting said lever to the union-bar I, to actuate said lever, when any registering-key is operated; an angular lever K, K', pivoted at K'', above the drawer-cover one end of which projects downwardly across the path of said cover the other portion of which projects under the union-key with the pin $i$, for engaging the same so that when the drawer-cover opens the lever will operate and throw the union-key to its highest position so that it will fall when the drawer-cover is pulled to its first or normal position; gear-wheels G, pivoted above and in front of the shaft F, on the shaft F', through the frame A''; arms M, M pivoted on said shaft or rod F', standing at angles to each other; transverse graduated bar M'', connecting the rear ends of the arms M; and stop-bar M''', connecting the front ends of the arms M; the dog S, on the graduated bar M'; the spring S', for holding it out of engagement with the gear-wheel G; a sliding bar $r$, with lugs or ears $r''$, at each end thereof and downwardly-projecting cam-shaped hook portions $r'$, below supported on rollers $v''$, through slots $v'$, therein; the bar $v$, on the pivots to rollers $v''$, for retaining said bar in position; shouldered projections $u$, to the rear of each of said keys beyond a beveled portion to engage the cam-hooks $r'$; pawls $c$, $c$, on said frame A'', to engage the ears $r''$, on the bar $r$, pawl O; bar J, extending across each division of keys with a spring $y$, to depress it; an arm J'', connected therewith to strike on the pawl O, to lock the gear G; pinions G', G'', actuated from teeth on the face of gear G; and adders H, H', actuated from said pinions G', G'' all substantially as described and coacting together for the purpose specified.

2. In a cash-register the combination of a group of register-keys B, pivoted toward the front of said register; downwardly-depending trailer portions B', to the rear of said keys with racks formed thereon; a transverse flat horizontal pivoted bar B'', extending across the rear of the group of said keys positioned to engage the racks on the trailer portion of said keys; upwardly-projecting ears at the ends of said bars; springs attached to said ears and to the frame above to put tension upon the bar and retain it normally in the horizontal position so that the bar shall form a universal reversible pawl for the keys of the group which shall reverse automatically on the completion of the stroke of the key for controlling the action of each of said keys as specified.

3. In a cash-register the combination of a group of register-keys B, with downwardly-projecting trailer portions B', to the rear ends thereof guided between suitable upright bars B⁴; wedge-shaped bodies $t$, forked at the top and of a width at that point equal to the width of a key plus the width of a guide-bar B⁴, supported point downward on said upright bars and secured in position by the hook-lugs $t'$, between the fork at the top to arrest the remaining keys of each section when any key is struck up for the purpose specified.

4. In a cash-register the combination of pivoted register-keys in groups or divisions; a common bar I, pivoted by lateral arms I', and extending across all of the keys of all of the sections; a union-key B², connected to said bar I, by a suitable hook I''; indicator-slides D, corresponding in number to the register-keys and situated above the same, to be actuated thereby; indicator-tablets situated at the top of said indicator-slides; catches D'' to the rear of said indicator-slides; bars E, E', E', for each division of the machine suspended to the back of the indicator-slides of each group, the bar E, being within the bars E', E', projecting from the bar E', E', out back of the bar E, and at a little distance therefrom; a lever C, pivoted in the casing of said machine in position to act upon the central bar E, and throw it out; a cam-lug C', to the lower end of said lever C; a cam-lug $a$, on the union-key B², in position to act upon the cam-lug C', when the union-key is actuated; a downwardly-projecting trailer portion on the union-key with a suitable rack thereon; and reversible pawl $b$, in position to engage the ratchets retain the union-key in the elevated position until it is raised to the end of its stroke, all coacting together substantially as described.

5. In a cash-register the combination of pivoted keys; common bar I, extending across said keys; a union-key B² connected to said bar by suitable means; indicator-slides corresponding to said keys and adapted to be raised thereby; a detaining-bar for said indicator-slides; a lever C, pivoted in the casing of said machine in position to act upon the detaining-bars; cam-lug C', to the lower end of said lever; cam-lug $a$, on the union-key in position to act upon the cam-lug C', when the union-key is actuated; a rack on said union-key and a reversible pawl for acting upon the same for detaining said key, all coacting as specified.

6. In a cash-register the combination of suitable registering-keys; an independent union-key connected by suitable means to be actuated when any register-key is operated; indicator-slides to be raised by said register-keys; a detaining-bar for said indicator-slides; a lever pivoted in the casing of said machine to act upon the detaining-bar; a cam-lug on said lever; and a cam-lug on said union-key in position to act upon the cam-lug of the lever and to pass the same to move the detaining-bar to release the indicator-slides whenever a key is actuated for the purpose specified.

7. In a cash-register the combination of suitable register-keys; an independent union-key connected by suitable means to be actuated when any register-key is to be actuated for a new registration; indicator-slides to be raised by said register-keys; a detaining-bar for said indicator-slides; and suitable connections from said detaining-bar to the independent union-key so that when the independent union-key is actuated the detaining-bar will be moved and release the indicator-slides for the purpose specified.

8. In a cash-register made up of suitable register-keys in sections or divisions, the combination of indicator-detaining devices for each section of indicator-slides; ears projecting from each sectional detaining device over the central section and at a little distance therefrom; a lever pivoted in the frame of said machine in position to act upon the central detaining-bar; a suitable independent union-key to act upon said lever when any register-key is actuated; and means connected with the drawer mechanism for holding said union-key in an inoperative position until the drawer is closed for the purpose specified.

9. In a cash-register made up of sections or divisions the combination of suitable register-keys for each section; indicator-slides for each section; separate detaining-bars for each section of indicator-slides one of said bars being inside the rest; ears projecting from the outer detaining-bar over the inner detaining-bar at a little distance therefrom; a suitable trip mechanism connected with registering-keys for throwing out the inner detaining-bar whenever a key of the register is operated; and connections with the cover for holding said tripping mechanism inoperative when the drawer is uncovered as specified.

10. In a cash-register made up of sections or divisions the combination of suitable register-keys for each section; indicator-slides for each section; separate detaining-bars for each section of indicator-slides one of said bars being inside the rest; ears or projections from the outer detaining-bars over the inner detaining-bars and at a little distance therefrom; a suitable tripping mechanism independent of said bars for tripping the inner detaining-bar at the beginning of each registration so that an indicator-slide can be struck up in each and any section at each registration without disturbing the indicator-slides of the other sections which have been struck up during that registration as specified.

11. In a cash-register the combination of the base A; the drawer P therein; forwardly and upwardly projecting hook-lever P' to engage the back of said drawer; the cover A', for the forward portion of the drawer riding on suitable rollers; forwardly-projecting rods $l$, from the rear of said base; coiled springs $l'$, supported thereby and connected to downwardly-projecting pins on the under side of said cover A'; a catch-lever P', pivoted to the under side of said cover and adapted to engage in a hole in the top of base A; lever Q, pivoted above the top of the base with a downwardly-projecting point to trip the catch of the drawer-cover; the common bar I, across all of the keys above and a suitable link $x'$, connecting said lever Q, to the common bar I, so that on the depression of any key the drawer-cover will be released and move back and uncover and unlock the drawer P, all substantially as described for the purpose specified.

12. In a cash-register the combination of the base A, with a drawer therein; cover A', for the drawer riding on suitable rollers; and a spring connection for said cover; a catch pivoted on said cover to engage in the top of said base and retain said cover in a closed position; a lever above with a downwardly-projecting part to trip the catch on said cover; and connections from said lever to the keys above all coacting together for the purpose specified.

13. In a cash-register the combination of a suitable base; a money-drawer in said base; a cover for the front portion of said money-drawer; a hook-lever pivoted to the rear of said base in position to engage the back of said money-drawer and projecting upwardly across the path of the cover so that when the cover is opened the drawer will be released and can be drawn out if necessary as specified.

14. In a cash-register the combination of the base A, with a drawer therein; sliding cover for said drawer with means to open it when released by the action of the keys; a union-key $B^2$, actuated from the register-keys for releasing the indicator-slides of the machine; a bent lever K, K', composed of parts pivoted above the path of said drawer-cover the part K', projecting across the path of the drawer-cover; a pin I, on part K, to engage under the union-key B², so that when the drawer comes open the lever will hold the union-key in the elevated position for the purpose specified.

15. In a cash-register the combination of a money-till; a cover for said till; an independent union-key connected to the register-keys of the machine to be actuated thereby and release the indicator-slides; and connections from said cover to said union-key to hold the same in an inoperative position when the drawer is opened for the purpose specified.

16. In a cash-register the combination of register-keys; an independent union-key connected therewith to be actuated by any one of them a part of its stroke; connections from said union-key to a trip mechanism for releasing the indicator-slides; a reversible pawl for retaining said union-key in its operated position so that it shall be inoperative until the pawl is released by completing its stroke for the purpose specified.

17. In a cash-register the combination of pivoted register-keys B, supported on a shaft F; a shaft F', parallel with said shaft F, and in front and above the same; gear-wheel G, on said shaft F', with suitable connections to numbering-wheels; arms M, M supported at an angle to each other on shaft F'; graduated bar M', supported on the rear ends of said arms transverse to said keys and in position to be actuated different distances by each of said keys; a dog attached to said bar for engaging the gear-wheel G; an angled stop-bar M'', on the front ends of said arms M, to strike against the keys in front of said shaft F', to stop the motion of the same and prevent over-registration as specified.

18. In a cash-register the combination of pivoted register-keys B, on shaft F, toward the front of said machine; the shaft F', in front of said shaft F; gear-wheel G, on said shaft F', at angles to each other; graduated bar M', supported on the rear ends of said arms M, in position to be actuated different distances by the different register-keys; a stop-bar M'', on the front ends of said bars M, to strike against the keys when they complete their stroke; a dog S, pivoted on arm M, in position to engage the gear-wheel G; a spring S', tending to throw dog S, out of engagement; sliding bar r, supported on rollers r'', on graduated bar M', in position to strike the dog S, and throw it into engagement with the gear G; bearing-lugs r''', r'''; bar r, for retaining said bar r, in position; downwardly-projecting cam-shaped hooks r', r', on the bar r, corresponding in number to the register-keys; shouldered lugs u, on said register-keys in position to engage in the hooks r', when a key is struck up and carry the bar to one side; and dogs c, supported on the frame of said machine to engage over the lugs r''', to hold the register mechanism locked until actuated by a key; a dog O, to engage said gear-wheel G; a bar J, pivoted by arms J', to be actuated by the register-keys with a spring y, for depressing the same; and curved arms J'', on said bar J, to strike the dog O, and lock the gear-wheel all coacting together substantially as described for the purpose specified.

19. In a cash-register the combination of pivoted register-keys B, on shaft F, toward the front of said machine; the shaft F', in front of said shaft F; gear-wheel G, on said shaft F', suitable number-wheels in position to be actuated by said gear-wheels; arms M, M on said shaft F', at angles to each other; graduated bar M', supported on the rear of said arms M, in position to be actuated different distances by the different register-keys; a stop-bar M'', on the front ends of said bars M, to strike against the keys when they complete their stroke; a dog S, pivoted on arm M, in position to engage the gear-wheel G; a spring S', tending to throw said dog S, out of engagement; sliding bar r, supported on rollers r'', on graduated bar M', in position to strike the dog S, and throw it into engagement with the gear G; bearing-lugs r''', r'''; bar r for retaining bar r in position; downwardly-projecting cam-shaped hooks r', r', on the bar r, corresponding in number to the register-keys; shouldered lugs u, on said register-keys in position to engage in the hooks r', when a key is struck up and carry the bar to one side; and dogs c, supported on the frame of said machine to engage over the lugs r''', to hold the register mechanism locked until actuated by a key; a dog O, to engage said gear-wheel G; substantially as described for the purpose specified.

20. In a cash-register the combination of pivoted register-keys B, on shaft F, toward the front of said machine; the shaft F', in front of said shaft F; gear-wheels G, on said shaft F', suitable number-wheels in position to be actuated by said gear-wheels; arms M, M on said shaft F', at angles to each other; graduated bar M', supported on the rear end of said arms M, in position to be actuated different distances by the different register-keys; a dog S, pivoted on arm M, in position to engage the gear-wheel G; a spring S', tending to throw said dog S, out of engagement; sliding bar r, supported on rollers r'', on graduated bar M', in position to strike the dog S, and throw it into engagement with the gear G, bearing-lugs r'' r'''; bar r, for retaining said bar r, in position; downwardly-projecting cam-shaped hooks r', r', on the bar r, corresponding in number to the register-keys; shouldered lugs u, on said register-keys in position to engage in the hooks r', when a key is struck up and carry the bar to one side; and dogs c, supported on the frame of said machine to engage over the lugs r''', to hold the register mechanism locked until actuated by a key; a dog O, to engage said gear-wheel G, substantially as described for the purpose specified.

21. In a cash-register the combination of pivoted register-keys B, on shaft F, toward the front of said machine; the shaft F', in front of said shaft F; gear-wheels G, on said shaft F', suitable number-wheels in position to be actuated by said gear-wheels; arms M, M on said shaft F', at angles to each other; graduated bar M', supported on the rear ends of said arms M, in position to be actuated different distances by the different register-keys; a dog S, pivoted on arm M, in position to engage the gear-wheel G; a spring S', tending to throw said dog S, out of engagement; sliding bar r, supported on rollers v'', on graduated bar M', in position to strike the dog S, and throw it into engagement with the gear G; bar v, for retaining said bar r, in position; downwardly-projecting cam-shaped hooks r', r', on the bar r, corresponding in number to the register-keys; shouldered lugs u, on said register-keys in position to engage in the hooks r', when a key is struck up and carry the bar to one side; a dog O, to engage said gear-wheel G; substantially as described for the purpose specified.

22. In a cash-register the combination of pivoted register-keys toward the front of said machine; gear-wheel G, supported on a suitable shaft; suitable number-wheels in position to be actuated by said gear-wheels; arms M, M, on said gear-wheel shaft standing at angles to each other; graduated bar supported on said arms in position to be actuated different distances by the different register-keys; downwardly-projecting hook portions on said graduated bar to engage the keys when they are struck against it to control the actuation of the keys and graduated bar together for the purpose specified.

23. In a cash-register the combination of pivoted register-keys toward the front of said machine; gear-wheel G, supported on a suitable shaft; suitable number-wheels in position to be actuated by said gear-wheel; arms M, M, on said gear-wheel shaft standing at angles to each other; graduated bar supported on said arms in position to be actuated different distances by the different register-keys; a sliding bar on said graduating-bar connected to be moved by the actuation of any key; a dog connected to said bar to engage said gear-wheel; for the purpose specified.

24. In a cash-register the combination of pivoted register-keys toward the front of said machine; gear-wheel G, supported on a suitable shaft; suitable number-wheels in position to be actuated by said gear-wheels; arms M, M, on said gear-wheel shaft standing at angles to each other; graduated bar supported on said arms in position to be actuated different distances by the different register-keys; a sliding bar on said graduating-bar connected to be moved by the actuation of any key; cam-hooks on said bar; a dog connected to said sliding bar in position to engage said gear-wheel; and a spring to throw said dog out of engagement for the purpose specified.

25. In a cash-register the combination of pivoted register-keys toward the front of said machine; gear-wheel G, supported on a suitable shaft; suitable number-wheels in position to be actuated by said gear-wheels; arms M, M, on said gear-wheel shaft standing at angles to each other; graduated bar supported on said arms in position to be actuated different distances by the different register-keys; a sliding bar on said graduating-bar connected to be moved by the actuation of any key; cam-hooks on said bar; a dog connected to said sliding bar in position to engage said gear-wheel; and a spring to throw said dog out of engagement; a projection on said sliding bar and a pawl or dog to engage it to lock the same after any registration for the purpose specified.

26. In a cash-register the combination of pivoted register-keys toward the front of said machine; gear-wheel G, supported on a suitable shaft; suitable number-wheels in position to be actuated by said gear-wheel; arms M, M on said gear-wheel shaft standing at angles to each other; graduated bar supported on said arms in position to be actuated different distances by the different register-keys; a sliding bar on said graduating-bar connected to move by the actuation of any key; cam-hooks on said bar; a dog connected to said sliding bar in position to engage said gear-wheel; and a spring to throw said dog out of engagement; a pawl to engage said sliding bar to lock the same after registration for the purpose specified.

27. In a cash-register the combination of register-keys; a graduated bar to be actuated by said keys a movable bar on said graduated bar in position to be operated by said keys; a dog connected to said movable bar to engage the register-wheels positively; coacting as specified.

28. In a cash-register the combination of register-keys; a graduated bar in position to be actuated by said keys; a dog carried by said graduated bars; connections from the dog to be actuated by the keys to engage the register-wheels positively for the purpose specified.

29. In a cash-register, the combination of register-keys; a graduating-bar in position to be actuated by said keys; engaging devices on said bar to connect it with said keys; a register mechanism; a dog carried by said bar positioned to be actuated and locked by said keys into positive engagement with said register mechanism during actuation, as specified.

30. In a cash-register the combination of register-keys; a register mechanism, a pawl to prevent the return of said mechanism; a graduating-bar with a bar thereon to engage positively the register mechanism; catches on said graduating-bar to engage the register-keys and lock them severally to said bar whenever one is operated; and suitable stops for said keys to prevent the operation of more than one at a time, as specified.

In witness whereof I have hereunto set my hand and seal in the presence of two witnesses.

LUKE COONEY, JR. [L. S.]

Witnesses:
    U. E. CHAPPELL,
    WALTER S. WOOD.